(12) United States Patent
Mann

(10) Patent No.: US 9,110,523 B2
(45) Date of Patent: Aug. 18, 2015

(54) STYLUS AND STYLUS CIRCUITRY FOR CAPACITIVE TOUCH SCREENS

(75) Inventor: John Conrad Mann, Traverse, MI (US)

(73) Assignee: JCM Electronics Stylus, LLC, Cave Creek, AZ (US)

( * ) Notice: Subject to any disclaimer, the term of this patent is extended or adjusted under 35 U.S.C. 154(b) by 141 days.

(21) Appl. No.: 13/607,051

(22) Filed: Sep. 7, 2012

(65) Prior Publication Data

US 2013/0002606 A1 Jan. 3, 2013

Related U.S. Application Data

(60) Provisional application No. 61/532,216, filed on Sep. 8, 2011, provisional application No. 61/639,951, filed on Apr. 29, 2012.

(51) Int. Cl.
*G06F 3/033* (2013.01)
*G06F 3/038* (2013.01)
*G06F 3/044* (2006.01)
*G06F 3/0354* (2013.01)

(52) U.S. Cl.
CPC .......... *G06F 3/0383* (2013.01); *G06F 3/03545* (2013.01); *G06F 3/044* (2013.01)

(58) Field of Classification Search
USPC ........................................................ 345/179
See application file for complete search history.

(56) References Cited

U.S. PATENT DOCUMENTS

| | | |
|---|---|---|
| 5,488,204 A | 1/1996 | Mead et al. |
| 5,942,733 A | 8/1999 | Allen et al. |
| 6,506,983 B1 | 1/2003 | Wilson et al. |
| 6,539,797 B2 | 4/2003 | Livingston et al. |
| 7,612,767 B1 * | 11/2009 | Griffin et al. ................. 345/179 |
| 7,626,622 B2 | 12/2009 | Kasuga et al. |
| 7,652,487 B2 | 1/2010 | Schulz et al. |
| 8,125,469 B2 | 2/2012 | Badaye et al. |
| 8,199,132 B1 * | 6/2012 | Oda et al. ...................... 345/179 |
| 2001/0033274 A1 | 10/2001 | Ong |
| 2003/0000303 A1 * | 1/2003 | Livingston et al. ......... 73/304 C |
| 2006/0227121 A1 | 10/2006 | Oliver |

(Continued)

FOREIGN PATENT DOCUMENTS

WO 2012087858 6/2012

OTHER PUBLICATIONS

International Search Report and Written Opinion for PCT/US12/67897 dated Apr. 9, 2013.

*Primary Examiner* — Dwayne Bost
*Assistant Examiner* — Robert Michaud
(74) *Attorney, Agent, or Firm* — Booth Udall Fuller, PLC

(57) ABSTRACT

A stylus for a capacitive touch screen includes an inverting charge integrator circuit is connected to a conductive tip for providing an output signal proportional to a charge induced at the conductive tip. An inverting amplifier generates an amplified signal proportional to the signal output from the inverting charge integrator. A conductive contact provides electrical or capacitive coupling between the amplified signal and an exterior of the stylus which may provide electrical or capacitive coupling with a person holding the stylus. In other embodiments, the order of the inverting charge integrator and the inverting amplifier may be reversed. A power supply circuit powers the inverting charge integrator and the inverting amplifier. Shielding may be implemented to isolate the stylus circuitry and prevent oscillation. The provided circuitry may enable a ball point or other fine point stylus tip configurations.

36 Claims, 13 Drawing Sheets

(56) References Cited

U.S. PATENT DOCUMENTS

| | | | |
|---|---|---|---|
| 2008/0150917 A1* | 6/2008 | Libbey et al. | 345/179 |
| 2008/0192509 A1* | 8/2008 | Dhuyvetter et al. | 363/17 |
| 2010/0213252 A1* | 8/2010 | Lapstun et al. | 235/375 |
| 2010/0225614 A1 | 9/2010 | Sung | |
| 2011/0181630 A1 | 7/2011 | Smith et al. | |
| 2011/0273400 A1* | 11/2011 | Kwon et al. | 345/174 |
| 2012/0026127 A1* | 2/2012 | Kim | 345/174 |
| 2012/0086664 A1* | 4/2012 | Leto | 345/174 |
| 2012/0161846 A1* | 6/2012 | Ningrat | 327/365 |
| 2012/0327041 A1 | 12/2012 | Harley et al. | |
| 2013/0106766 A1 | 5/2013 | Yilmaz et al. | |

* cited by examiner

STYLUS AND STYLUS CIRCUITRY FOR CAPACITIVE TOUCH SCREENS

CROSS-REFERENCE TO RELATED APPLICATIONS

U.S. Provisional Patent Application Ser. No. 61/532,216 filed Sep. 8, 2011, and U.S. Provisional Patent Application Ser. No. 61/639,951 filed Apr. 29, 2012, the disclosures of which are incorporated in their entirety by reference.

BACKGROUND

Embodiments of the present invention pertain to stylus technology, and in particular circuitry enabling interaction between a stylus and a capacitive touch screen. One manufacturer of capacitive touch screens and stylus technology includes SYNAPTICS, INC. having its Corporate Headquarters at 3120 Scott Blvd., Santa Clara, Calif. 95054.

U.S. Pat. No. 8,125,469 titled "Passive stylus for capacitive sensors" discloses in its Abstract a passive stylus for capacitive sensors comprising a tip and a shaft. The tip is configured to couple electrically with a capacitive sensing device and to couple physically and electrically with the stylus shaft. The tip comprises a contact surface, a support region, and a flexible region. The contact surface is configured to contact a device surface associated with the capacitive sensing device. The flexible region is disposed between the contact surface and the support region. The flexible region comprises a hardness gradient. The support region is configured to provide structural support to the flexible region.

U.S. Pat. No. 5,942,733 titled "Stylus input capacitive touchpad sensor" discloses in its Abstract a capacitive touchpad comprising a substrate material, such as a PC board type laminate material, having a plurality of first parallel conductive traces running in a first (X) direction disposed on a first face thereof, and a plurality of second parallel conductive traces running in a second (Y) direction, usually orthogonal to the first direction, disposed on an opposed second face thereof. A layer of pressure-conductive material is disposed over one of the faces of the substrate. A protective layer with a conductive coating on its back surface is disposed over the top surface of the pressure-conductive material to protect it. In an alternate embodiment, a capacitive touch sensor comprises a rigid substrate material having a conducting material disposed on one face thereof. A layer of pressure-conductive material is disposed over the conductive material on the substrate. A flexible material, having a plurality of first parallel conductive traces running in a first (X) direction disposed on a first face thereof, and a plurality of second parallel conductive traces running in a second (Y) direction disposed on an opposed second face thereof is disposed over the layer of pressure-conductive material. A protective layer is disposed over the top surface of the pressure conductive material to protect it. In yet another embodiment, an air gap is used in place of the layer of pressure-conductive material and the upper layers are supported by a frame at the periphery of the touchpad.

U.S. Pat. No. 5,488,204 titled "Paintbrush stylus for capacitive touch sensor pad" discloses in its Abstract a proximity sensor system including a touch-sensor pad with a sensor matrix array having a characteristic capacitance on horizontal and vertical conductors connected to sensor pads. The capacitance changes as a function of the proximity of an object or objects to the sensor matrix. The change in capacitance of each node in both the X and Y directions of the matrix due to the approach of an object is converted to a set of voltages in the X and Y directions. These voltages are processed by circuitry to develop electrical signals representative of the centroid of the profile of the object, i.e, its position in the X and Y dimensions. Noise reduction and background level setting techniques inherently available in the architecture are employed. A conductive paintbrush-type stylus is used to produce paint-like strokes on a display associated with the touch-sensor pad.

U.S. Pat. No. 7,612,767 titled "Trackpad pen for use with computer touchpad" discloses in its Abstract a pen or stylus for use with a finger activated computer touchpad that uses capacitively coupled voltage signals to simulate the capacitive effect of a finger on the touchpad. In addition, the pen has buttons that can be utilized to capacitively couple control signals to the touchpad that are interpreted by application software as specific user-defined inputs. The pen has a conductive tip that is placed into contact with the touchpad. By biasing the touchpad electrodes with a properly timed voltage signal, the pen alters the charging time of the electrodes in the touchpad. This alteration in charging time is interpreted by the touchpad as a change in capacitance due to the presence of a user's finger. Thus, the pen can be used with touchpads that were designed to only detect finger movements.

U.S. Patent Application Publication No. 2010/0225614 titled "Stylus Device Adapted For Use With A Capacitive Touch Panel" discloses in its Abstract a stylus device adapted for use with a capacitive touch panel, that includes a main body having a handle portion, and a transparent touch portion connected to the handle portion, adapted to be placed on the capacitive touch panel and having a flat touch surface. A transparent conductive membrane is formed on the touch portion and the handle portion, and covers the touch surface of the touch portion so that the transparent conductive membrane connects electrically a user's hand when the handle portion of the main body is held by the user's hand.

Embodiments of the present invention provide an alternative to known stylus technology for capacitive touch screen interfaces.

SUMMARY

Embodiments of the present invention include a stylus for a capacitive touch screen, and stylus circuitry. According to one embodiment, the stylus includes a conductive tip for providing capacitive coupling with a capacitive touch screen. An inverting charge integrator is connected to the conductive tip for providing an output signal proportional to a charge induced at the conductive tip. An inverting amplifier generates an amplified signal proportional to the signal output from the inverting charge integrator. A conductive contact provides electrical or capacitive coupling between the amplified signal and an exterior of the stylus. A power supply circuit powers the inverting charge integrator and the inverting amplifier.

According to another embodiment, an inverting transimpedance amplifier is connected to the conductive tip for generating an output signal proportional to a current induced at the conductive tip. An inverting integrator provides an output voltage proportional to an integrated output signal of the inverting transimpedance amplifier.

Another embodiment comprises a stylus for a capacitive touch screen. The stylus includes an elongated barrel for enclosing a stylus circuit. The stylus circuit includes an integrator circuit connected to a conductive tip of the stylus for generating an output signal proportional to a charge induced at the conductive tip, and an amplifier circuit for providing an output voltage proportional to the output signal from the integrator circuit. They stylus also includes a conductive contact for providing electrical or capacitive coupling between the output voltage from the amplifier circuit and a surface of the stylus. In an alternative configuration, an integrator circuit is connected to a conductive tip of the stylus for generating an output signal proportional to a charge induced at the conductive tip. An amplifier circuit provides an output voltage proportional to the output signal from the integrator circuit that is then coupled with a surface of the stylus.

Another embodiment includes a stylus for a capacitive touch screen comprising circuitry for determining an amount of charge induced at a stylus tip by a positive or negative going drive line transition in a capacitive touch screen. They stylus also includes circuitry for outputting to an exterior of the stylus a positive or negative going voltage change that is proportional to the determined amount of charge. In this configuration, a positive going drive line transition results in a positive going output voltage change, and a negative going drive line transition results in a negative going output voltage change.

Yet another embodiment includes a method for charging a tip of a stylus for a capacitive touch screen. The method includes determining an amount of charge induced at a stylus tip by a positive or negative going drive line transition in a capacitive touch screen, and outputting to an exterior of the stylus a positive or negative going voltage change that is proportional to the determined amount of charge. According to the method, a positive going drive line transition results in a positive going output voltage change, and a negative going drive line transition results in a negative going output voltage change.

The inverting charge integrator and/or the inverting amplifier may include one or more operational amplifiers. These components and/or their functions may also be integrated. Shielding may be provided for isolating components of the circuit such as the connection between the tip and the inverting charge integrator. The shielding may be connected to a ground of the stylus circuit. The shielding may take the form of a conductive enclosure having a circular cross-section and extending along an axis of at least a portion of the stylus, a conductive wrapping around at least a portion of the stylus circuit, a substantially continuous conducting layer of a circuit board for the stylus circuit, and/or one or more conducting planes above and/or below a plane of the stylus circuit.

The circuitry may include a power supply having one or more batteries. The batteries may be rechargeable. The power supply may include a DC-to-DC converter for increasing voltage supplied to the circuitry. An input ground and an output ground of the DC-to-DC converter may be common. In other embodiments, the DC-to-DC converter may include regulator circuitry utilizing feedback for regulating an output voltage. An optical isolator may be utilized for communicating a level of the output voltage to a feedback input to the convertor.

The tip of the stylus may take a variety of forms such as a ball point or other fine point of contact. The tip may comprise a metal and/or a conductive polymer. The tip may have a cross-section projected onto the touch screen of less than 3.5 millimeters.

These and other embodiments of the invention, as recited in the claims, are described below.

DETAILED DESCRIPTION

Detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
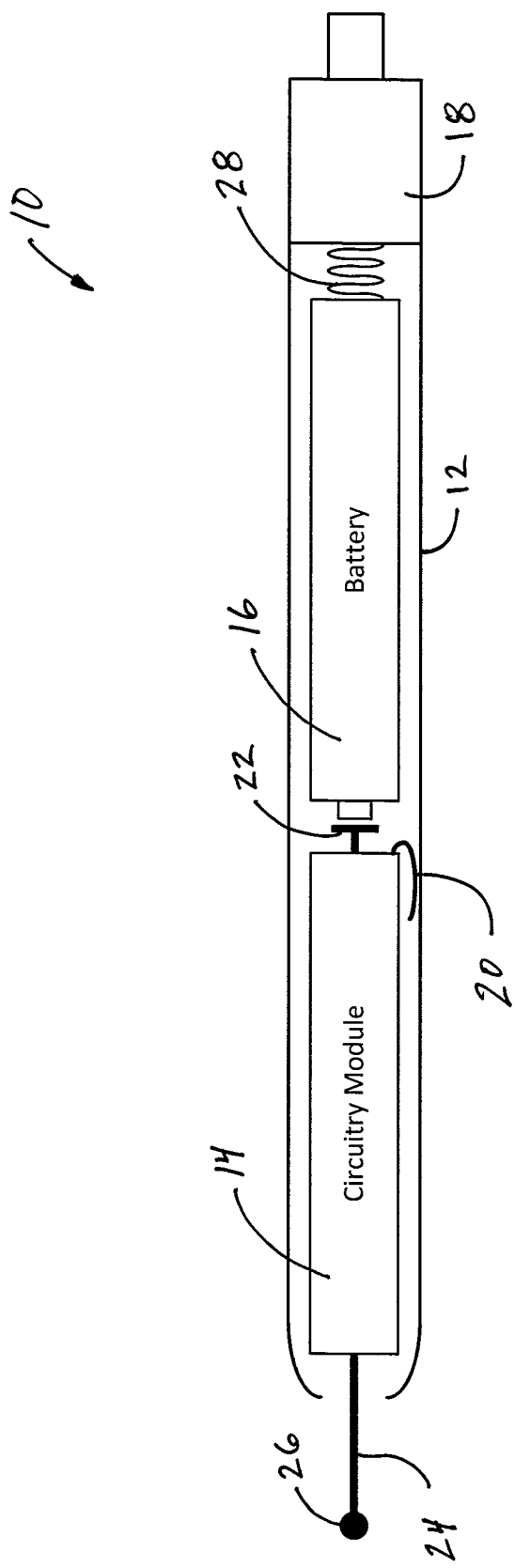
FIG. 1 is an example cross section of a stylus assembly for a capacitive touch screen in accordance with one embodiment of the present invention.

FIG. 1 is an example cross section of a stylus assembly 10 for a capacitive touch screen in accordance with one embodiment of the present invention. Stylus assembly 10 includes a barrel 12. Barrel 12 may be manufactured of electrically conductive material such as metal, an electrically conductive polymer, or other material capable of capacitively coupling changes in voltage at connector 20 (or other suitable connection) with the body of a person holding stylus assembly 10.

Battery 16 may comprise any battery form, and any number of batteries depending on the desired stylus shape and desired voltage level. In this example, a AAA alkaline penlight battery is used. Battery 16 may be rechargeable. A battery charge circuit and charge status LED (not shown) may be included in assembly 10. As discussed in detail below, battery 16 provides power to circuitry module 14 for operating the stylus assembly.

Switch 18 may be implemented to complete or interrupt the power supply from the battery 16 to the circuitry module 14. Switch 18 may take any form depending on the particular configuration of the stylus and the desired design. Switch 18 may be a traditional penlight push-button switch as shown in FIG. 1.

Contact 22 provides electrical connection between the positive pole of battery 16 and circuitry module 14. Spring contact 28 provides electrical connection between the negative pole of battery 16 and switch 18, which is then connected to the power supply ground and stylus circuitry output (not shown) of circuitry module 14 via the conductive housing of the stylus. Of course, other battery connections and switch configurations may be implemented depending on the particular geometric configuration of the stylus.

Stylus assembly 10 includes tip 26 having electrical connectivity 24 to stylus circuitry 14. Tip 26 may comprise a variety of configurations including but not limited to a ball point, a fine tip or other low contact area geometry. Tip 26 may comprise a metal, an electrically-conductive polymer, or a combination of both. Tip 26 may be coated with TEFLON or other suitable material to prevent scratching the surface of the touch screen. Embodiments of the present invention may enable tip diameters below 3 mm. Larger diameters may also be utilized.

Figure 2:
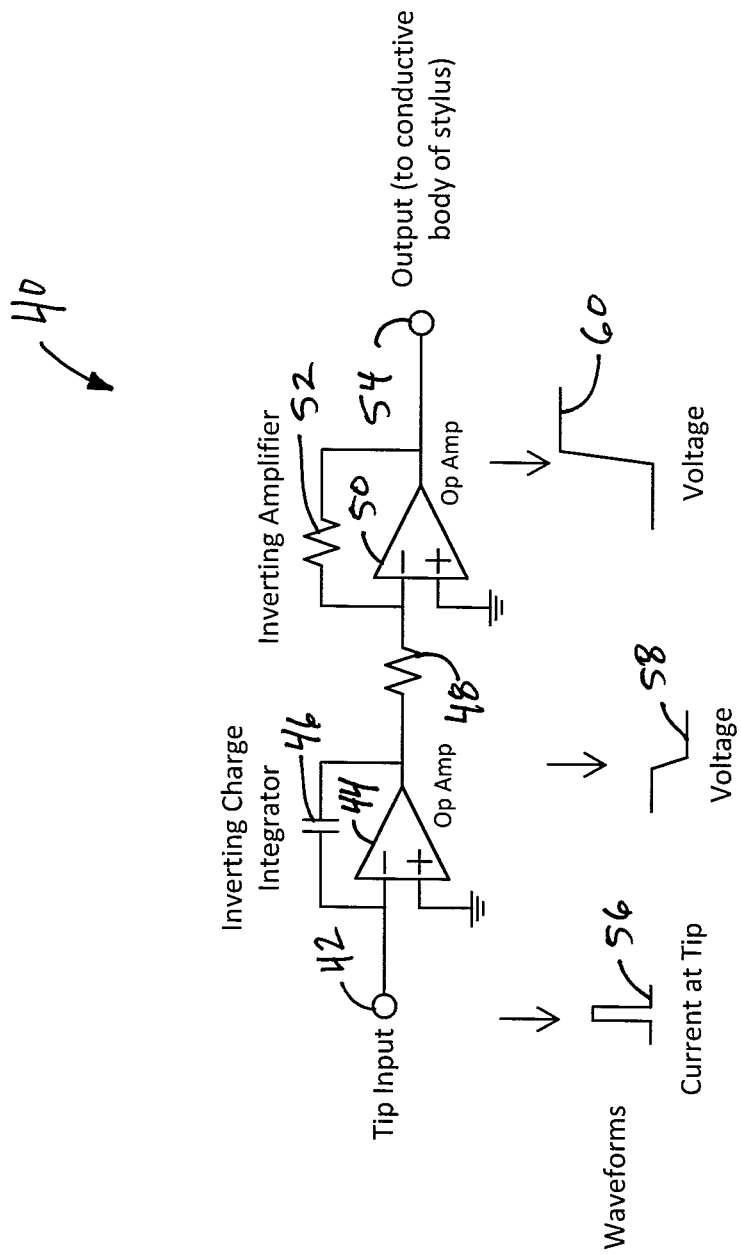
FIGS. 2-4 illustrate example alternative stylus circuitry schematics that may be included within circuitry module illustrated in FIG. 1.
Figure 3:
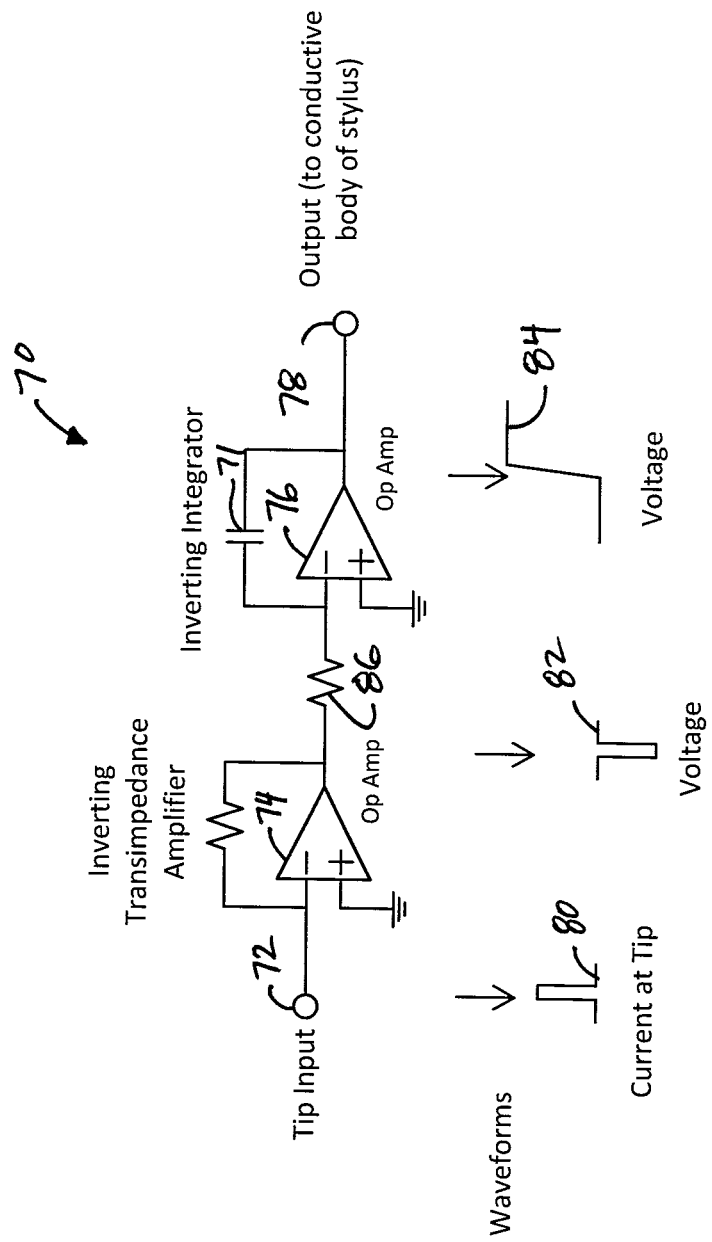
Figure 4:
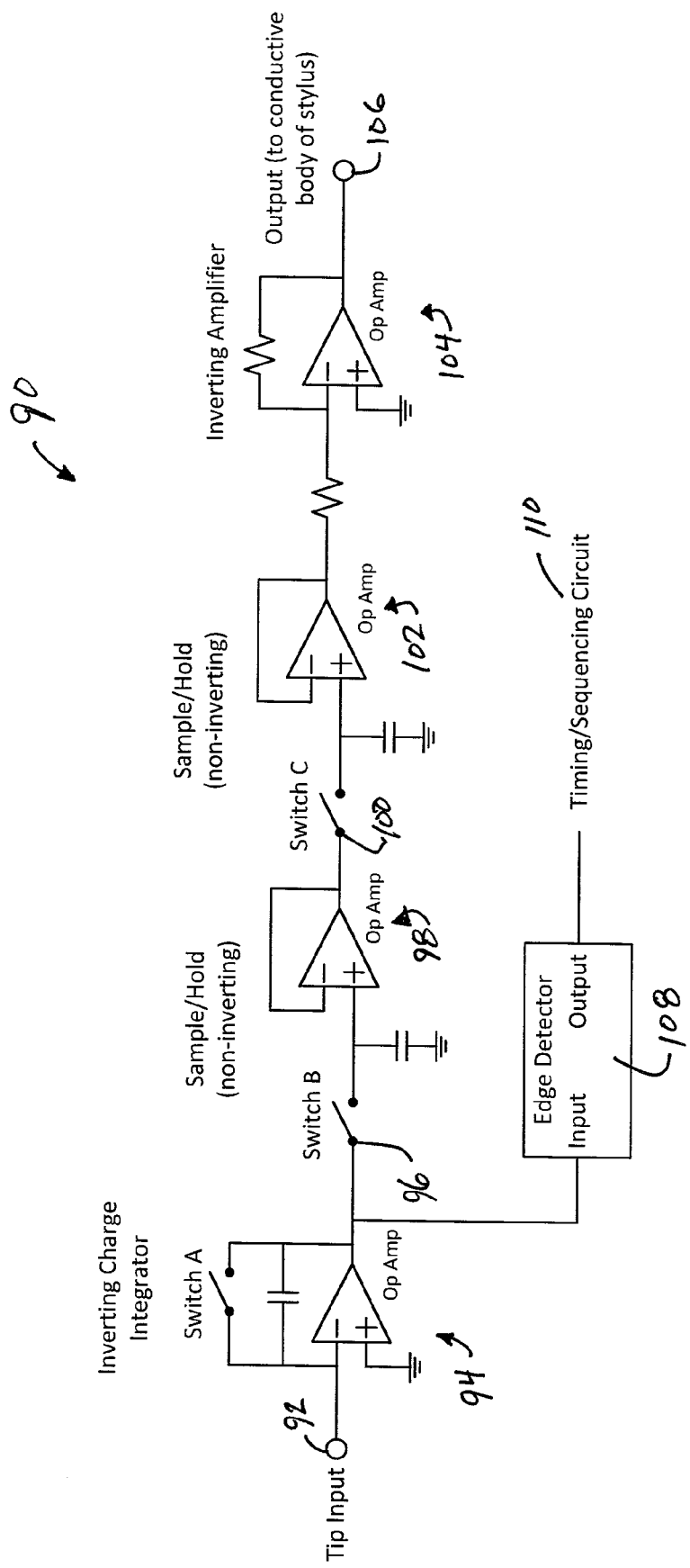

FIGS. 2-4 illustrate example stylus circuitry schematics that may be included within circuitry module 14 illustrated in FIG. 1. Other circuit configurations may be implemented within the scope of the invention as recited in the claims. The circuitry may comply with the following transfer function:

$$V_{out}=A\cdot\int I(in)dt$$

Where $V_{out}$ is the voltage output of the circuit connected to the conductive body of the stylus assembly 12, A is the amplifier gain of the circuit with dimensions of inverse farads, and I(in) is the input current at tip 26 induced from the capacitive coupling tip of 26 with the capacitive touch screen during a drive line transition.

Example schematic 40 illustrated in FIG. 2 includes tip input 42 connected to an inverting charge integrator comprising operational amplifier 44 and capacitor 46. Operational amplifier 44 may be, for example, MICREL Part No. MIC921. In this example, capacitor 46 may be in the range of 2-10 pF. The output of the inverting charge integrator is input into an inverting amplifier comprising operational amplifier 50, resistor 52 and resistor 48. In this example, resistor 52 is in the order of 5-20 kΩ and resistor 48 is in the range of 1-5 kΩ. The ratio of resistor 52 to resistor 48 defines the gain of the inverting amplifier. This ratio may be adjusted to generate an appropriate output voltage for operation of the stylus with a plurality of different capacitive touch screen configurations. The gain may also be adjusted to reduce or eliminate oscillation. Operational amplifier 50 may be, for example, LINEAR TECHNOLOGIES Part No. LT 1354 having output in the range of +/−10 volts. Power supplied to operational amplifiers 44 and 50 is not shown.

Output of inverting operational amplifier 50 may be connected to the body or external surface of stylus barrel 12 via connector 20 illustrated in FIG. 1. Other connections between stylus circuitry output and the stylus barrel exterior 12 may be implemented. For example, a direct contact may be established between the circuitry module exterior (to which the circuitry output may be connected) and the interior of barrel 12. Alternatively, a portion of the circuitry module 14 connected to the circuitry output may be threaded for physically and electrically attaching to the stylus housing. Other contact configurations may be implemented.

Waveform 56 shows a current spike generated at tip 42 resulting from a positive transition of drive line voltage at the touch screen (not shown). Inverting charge integrator 44 outputs a downward voltage transition 58 that is proportional to the charge induced at the tip 42. Inverting amplifier 50 outputs an amplified positive voltage transition 60 to the conductive external surface of the barrel 12 that is proportional to the input voltage drop 58.

Circuit 40 may require shielding to prevent oscillation caused by detection at inverting input of operational amplifier 44 of the voltage output to stylus body 12 via contact 20 illustrated in FIG. 1. Example alternatives for shielding circuit 40 are described below.

FIG. 3 illustrates an alternative schematic 70 for circuitry module 14 illustrated in FIG. 1. Example schematic 70 includes tip input 72 connected to the input of an inverting transimpedance amplifier 74. The output of transimpedance amplifier 74 is connected to an inverting integrator 70 composed of resistor 86, operational amplifier 76, and capacitor 71. Output of inverting integrator operational amplifier 76 is connected to the body or external surface of stylus barrel 12 via connector 20 illustrated in FIG. 1.

Waveform 80 shows a current spike generated at tip 72 resulting from a positive transition of drive line voltage at the touch screen (not shown). Inverting transimpedance amplifier 74 outputs a negative voltage spike 82 that is proportional to the current induced at the tip 42. Inverting integrator 76 outputs an amplified positive voltage transition 84 to the conductive external surface of the barrel 12 that is proportional to the negative voltage spike 82.

Circuit 70 may require shielding to prevent oscillation caused by detection at inverting input of operational amplifier 74 of the voltage output to stylus body 12 via contact 20 illustrated in FIG. 1. Example alternatives for shielding circuit 70 are described below.

FIG. 4 illustrates an alternative schematic 90 for circuitry module 14 illustrated in FIG. 1. Circuit 90 is similar to circuit 40 illustrated in FIG. 2, with the addition of sample/hold elements 98 and 102, edge detector 108 and timing/sequence circuit 110. The introduction of sample/hold elements 98 and 102 may reduce or eliminate oscillation caused by detection at inverting input of operational amplifier 74 of the voltage output to stylus body 12, thus reducing or eliminating the need for shielding of circuit 90.

Figure 5:
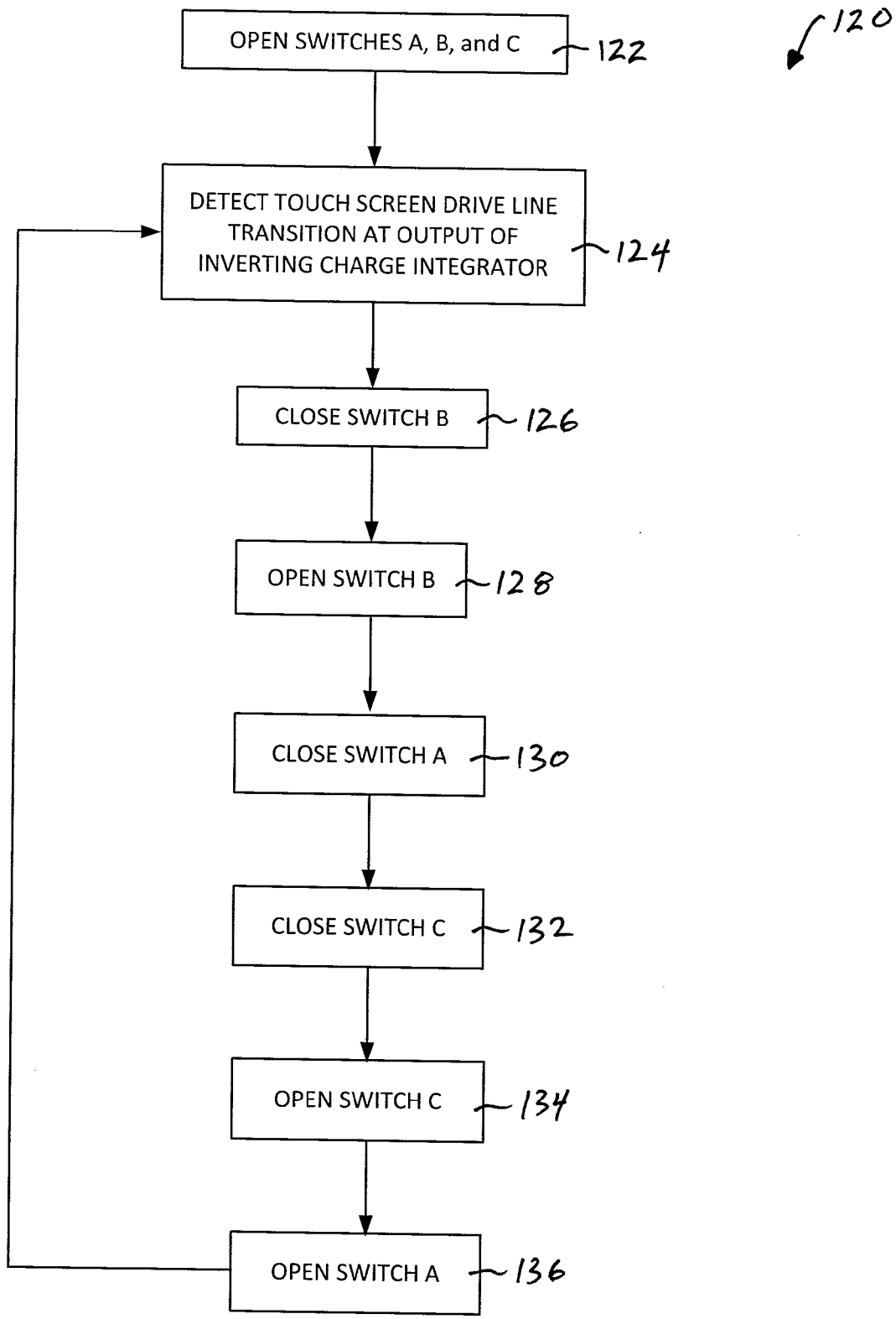
FIG. 5 is a flow diagram describing an example operation of the circuitry disclosed in FIG. 4.

FIG. 5 is a flow diagram describing an example operation 120 of circuit 90. The operation of circuit 90 is not limited to the particular process illustrated in FIG. 5. Modifications to the circuit 90 and process 120 may be made to best-fit a particular implementation. At initial step 122, switches A, B and C are open awaiting detection by edge detector 108 of a drive line transition at touch screen. Upon detection of a drive line transition at edge detector 108 at step 124, timing/sequence circuit 110 closes switch B at step 126 supplying voltage to sample/hold element 98. Timing/sequence circuit then opens switch B at step 128 to isolate sample/hold element 98 from inverting charge integrator 94. Timing/sequence circuit 110 closes switch A at step 130. Timing/sequence circuit then closes and opens switch C at steps 132 and 134. Timing/sequence circuit 110 then opens switch A at step 136, and returns the process to step 124 to detect another drive line transition.

Figure 6:
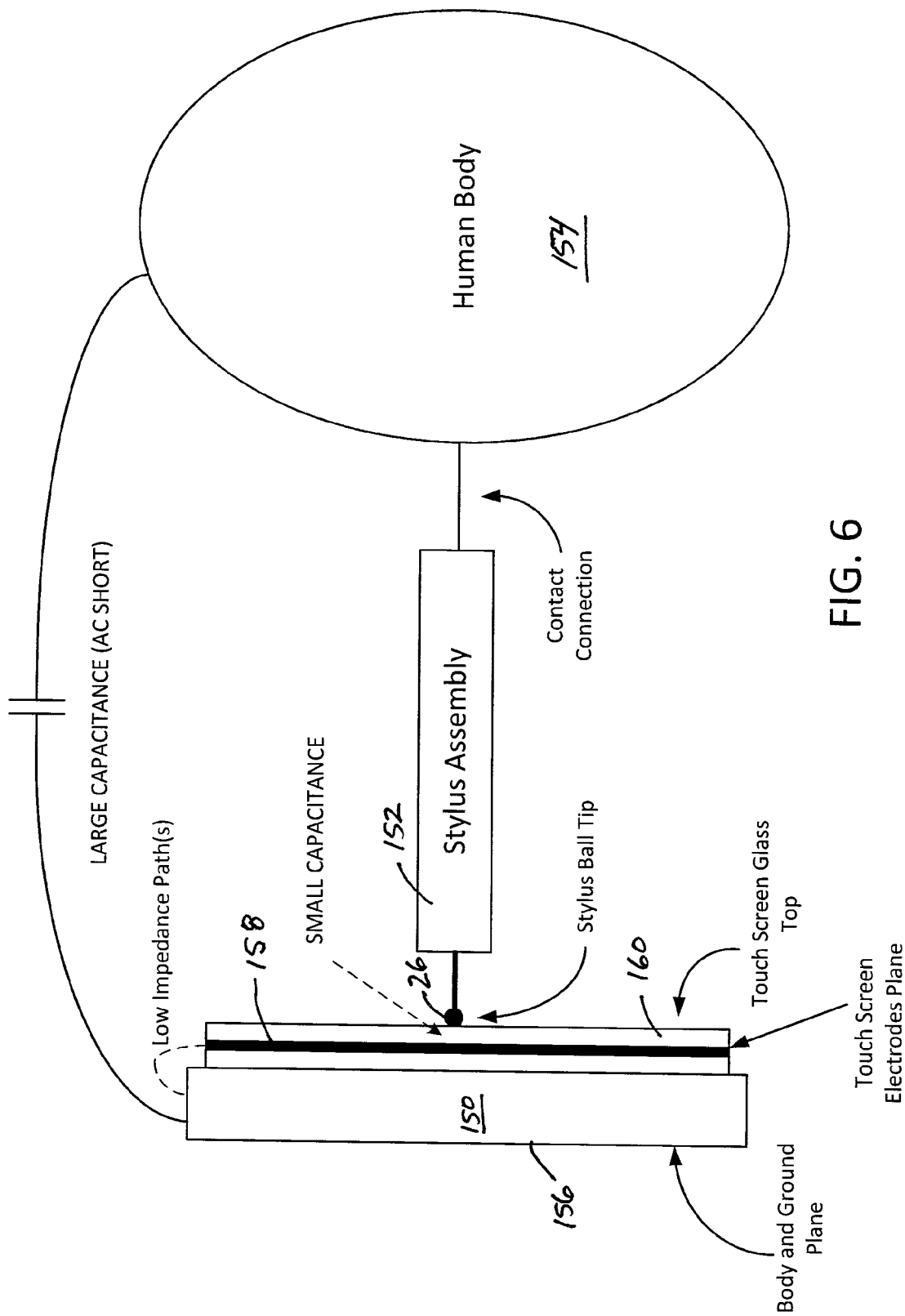
FIG. 6 illustrates an example capacitive circuit formed between a capacitive touch screen, stylus assembly, and the body of a person holding the stylus assembly.

FIG. 6 illustrates an example capacitive circuit formed between a capacitive touch screen 150, stylus assembly 152 and the body of a person 154 holding the stylus assembly 152. Touch screen 150 may include a body and ground plane 156, a drive and sense electrode plane 158 and top glass 160. A relatively small capacitance exists between stylus tip 26 and touch screen electrodes 158 (e.g. ~0.6 pF) in comparison to the relatively large capacitance that exists between the human body 154 and the touch screen ground plane 156 (e.g. ~100 pF). The connection between the human body 154 and the ground plane may therefore be viewed as an AC short in the capacitive circuit illustrated in FIG. 6. As a result, the body 154 may be at the same potential as the ground plane 156.

Figure 7:
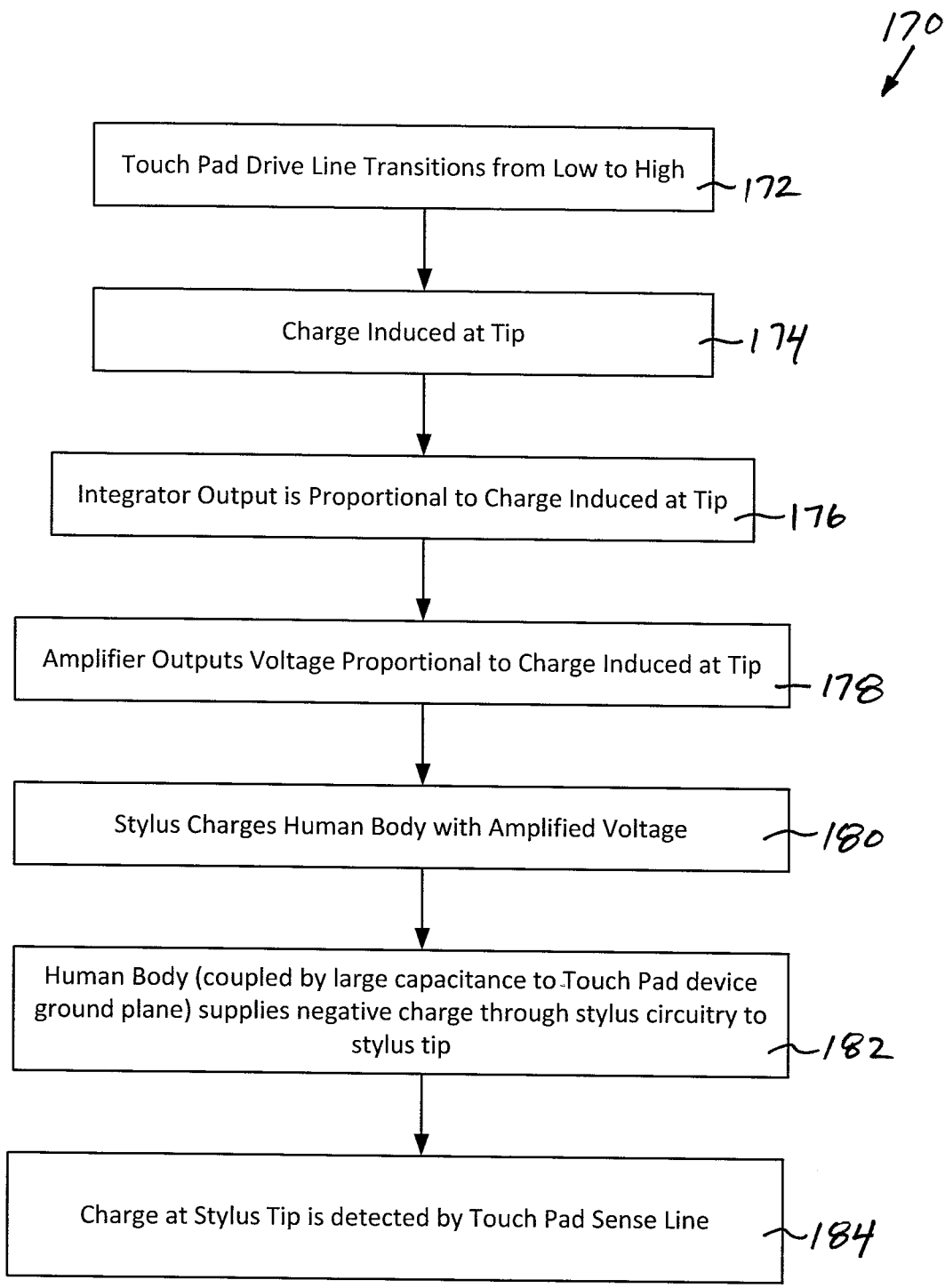
FIG. 7 is a flow chart illustrating an example operation of the stylus circuitry of FIG. 2 as implemented in the stylus assembly of FIG. 1 within the capacitive circuit illustrated in FIG. 6.

FIG. 7 is a flow chart illustrating an example operation 170 of the stylus circuitry of FIG. 2 as implemented in the stylus assembly of FIG. 1 within the capacitive circuit illustrated in FIG. 6. At step 172, one or more touch pad drive lines transition from low (e.g. 0 volts) to high (e.g. 3.7 volts). At step 174, a charge is induced at the tip 26 of the stylus assembly. At step 176, the charge integrator outputs a negative voltage proportional to the charge induced at the tip 26. At step 178, the amplifier outputs an amplified positive voltage proportional to the charge induced at the tip 26. At step 180, the amplified voltage charges the human body 154 via contact 20 in electrical communication with stylus exterior 12 gripped by a user's hand. Because the body 154 is at the same potential as the ground plane 156, negative charge is supplied from the body through the stylus circuitry to the stylus tip 26 at step 182. At step 184 the negative charge supplied to tip from the body 154 is detected by one or more of the touch screen sense lines.

In an alternative configuration to the schematics shown above, a charge integrator may be implemented without a separate inverting amplifier, to generate an appropriate output voltage of the proper polarity. Alternative circuit configurations for stylus circuitry may also include a current integrating amplifier connected to the stylus tip whose output may input to a voltage controlled oscillator which generates pulses proportional to the voltage output by the current integrating amplifier. The output of the voltage controlled oscillator is a pulse train having a frequency proportional to the input voltage of the voltage controlled oscillator. The output of the voltage controlled oscillator is input into an RC low pass filter, having an output connected to the exterior of the stylus barrel.

Other analog implementations having discrete components generally complying with the transfer function and/or functionality described above. Other alternative configurations may include a digital processor for performing one or more of the functions described above, and having analog-to-digital and digital-to-analog converters for the processor input and output, respectively. A digital implementation may include appropriate discrete circuit components for power supply and interfacing with the stylus tip and barrel.

Figure 8:
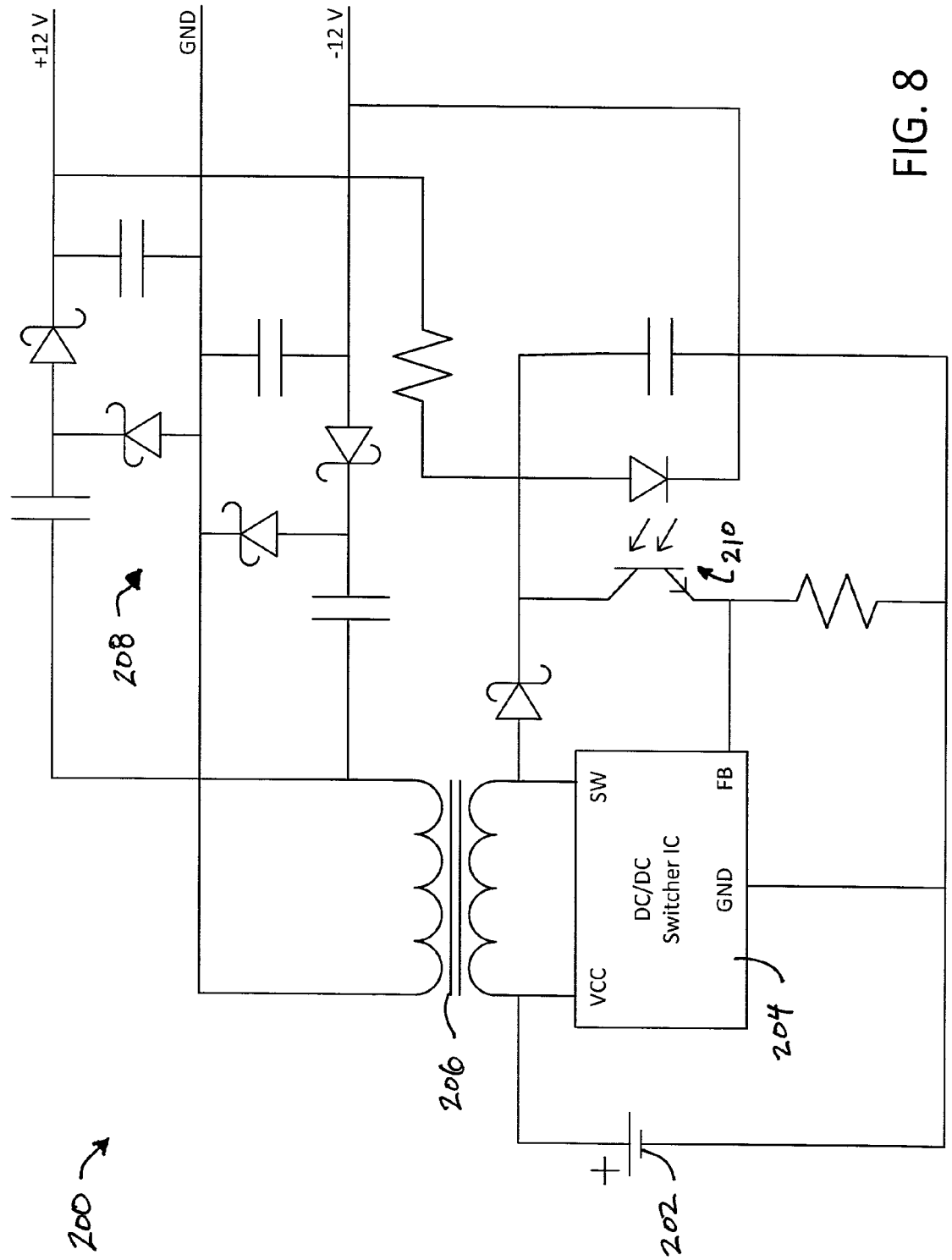
FIGS. 8-10 illustrate alternative power supply configurations for the stylus circuitry.

FIG. 8 illustrates an example isolating power supply circuit 200 for stylus circuitry described in FIGS. 2-4. Other power supply circuits may be implemented. In this example, one or more batteries 202 supply DC voltage (e.g. 1.2-3.7 volts) to a DC/DC switcher IC 204. DC/DC switcher IC may be, for example, LINEAR TECHNOLOGIES Part No. LT1615. The Vcc and SW outputs of DC/DC switcher IC 204 are connected to transformer 206 for generating, AC current, +/−12 volts in this example. Transformer 206 may be, for example, COOPER BUSSMAN Part No. SDQ12-100-R. The AC output of transformer 206 is input into rectifier 208 which, in turn, outputs +/−12 VDC. The diodes comprising rectifier 208 may be, for example, DIODES, INC. Part No. ZHCS400.

Feedback may be provided to DC/DC switcher 204 to ensure constant DC voltage at the output of rectifier 208. In this embodiment, a photo isolator 210 is implemented to provide electrical isolation between the power supply output by rectifier 208 and the battery power supply 202. Photo isolator 201 may be, for example IXYS CORP., Part No. CPC1001N. Because the output of the stylus circuitry disclosed in FIGS. 2-4 and 6-7 is connected to the stylus body, the isolating configuration shown in FIG. 8 electrically isolates the battery potential from the stylus output.

Figure 9:
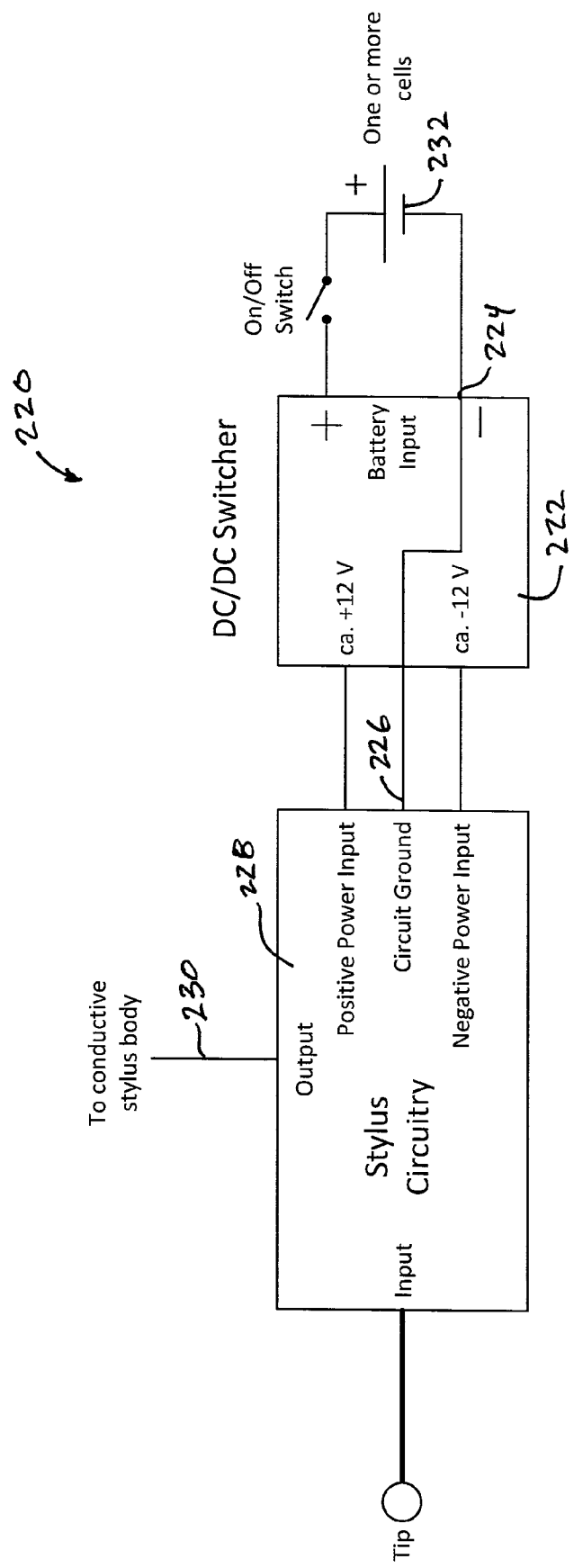

FIG. 9 illustrates an alternative power supply configuration in which the negative input 224 to DC/DC switcher 222 is electrically connected to the circuit ground 226 of stylus circuitry 228. This configuration electrically isolates the output 230 of the stylus circuitry (connected to the stylus body) from the potential created by the battery cell(s) 232.

Figure 10:
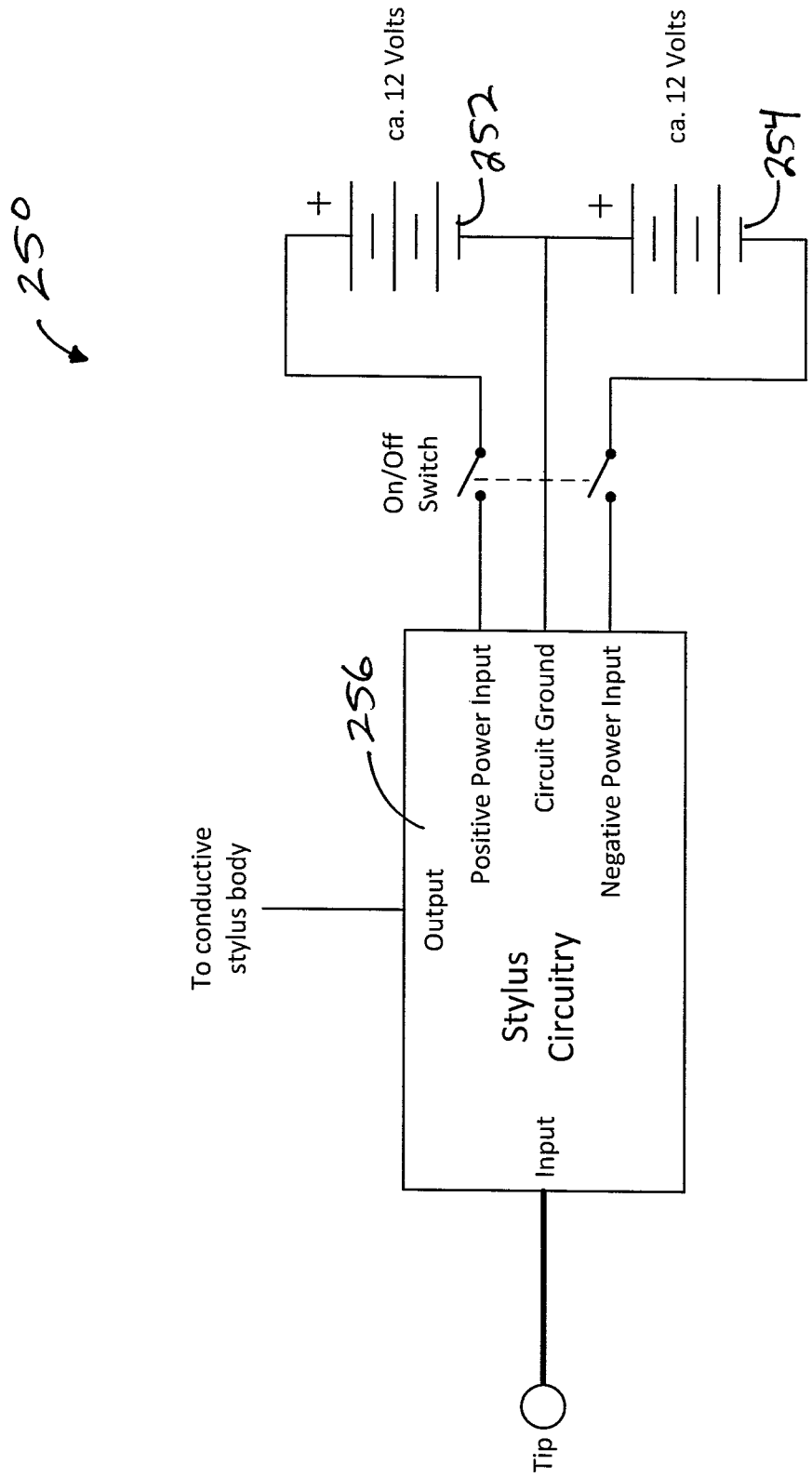

FIG. 10 illustrates an alternative power supply configuration in which no components are necessary to increase DC voltage of the battery cell(s). In this configuration, one or more batteries 252 and 254 are arranged to provide sufficient potential, e.g. +/−12 VDC, for operating stylus circuitry 256.

Figure 11A:
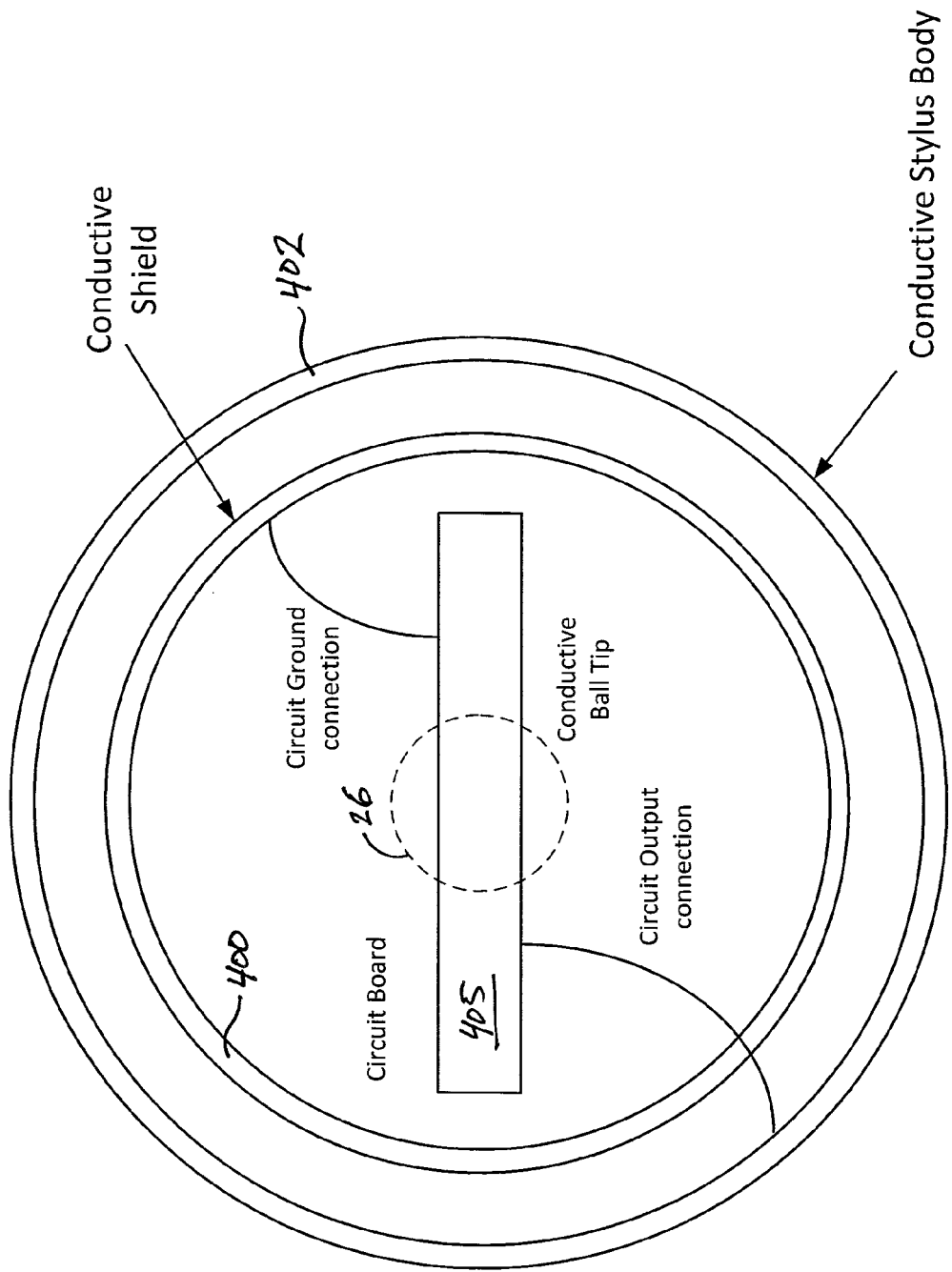
FIGS. 11a-11c illustrate alternative shielding configurations for the stylus circuitry.
Figure 11B:
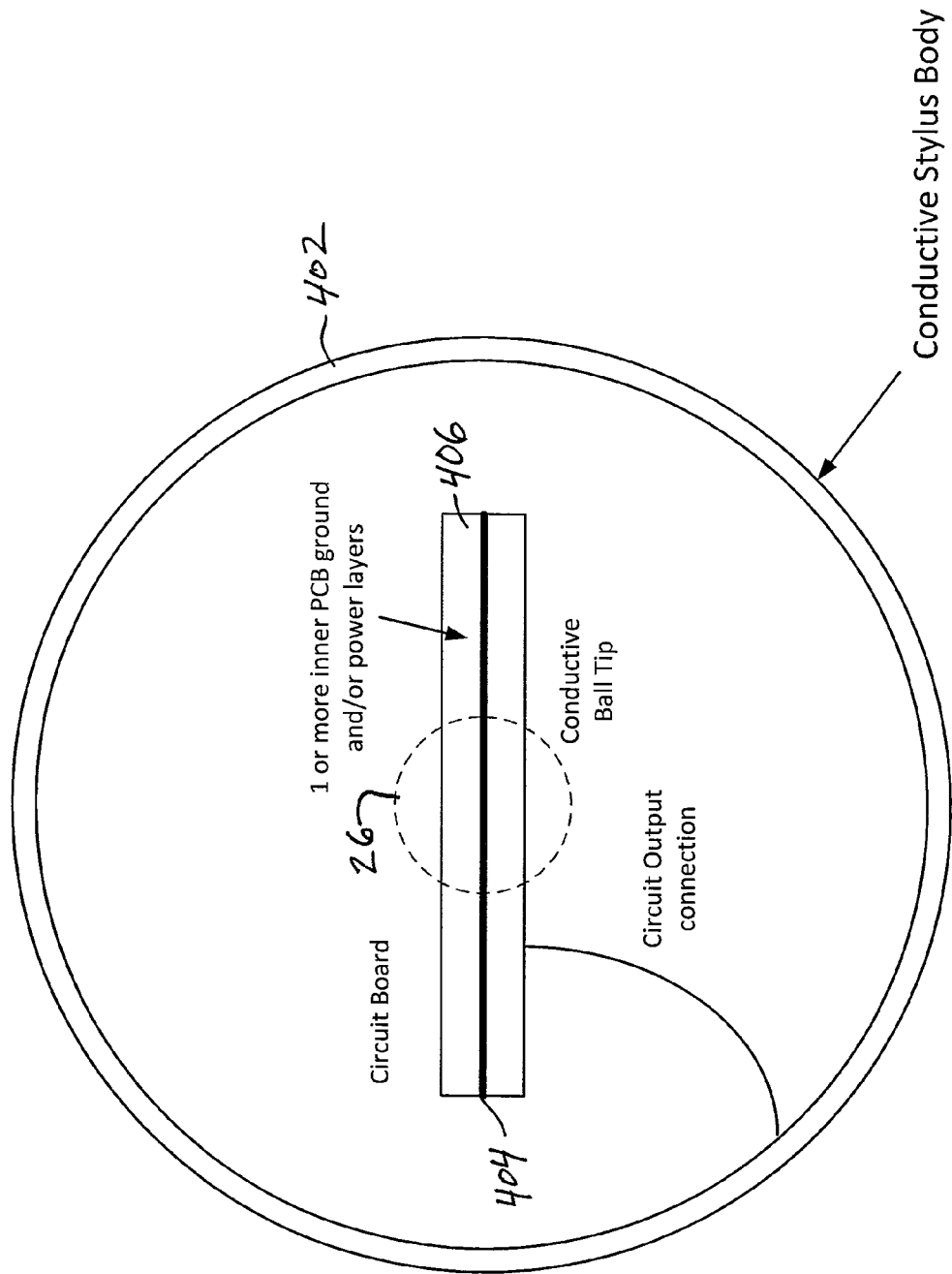
Figure 11C:
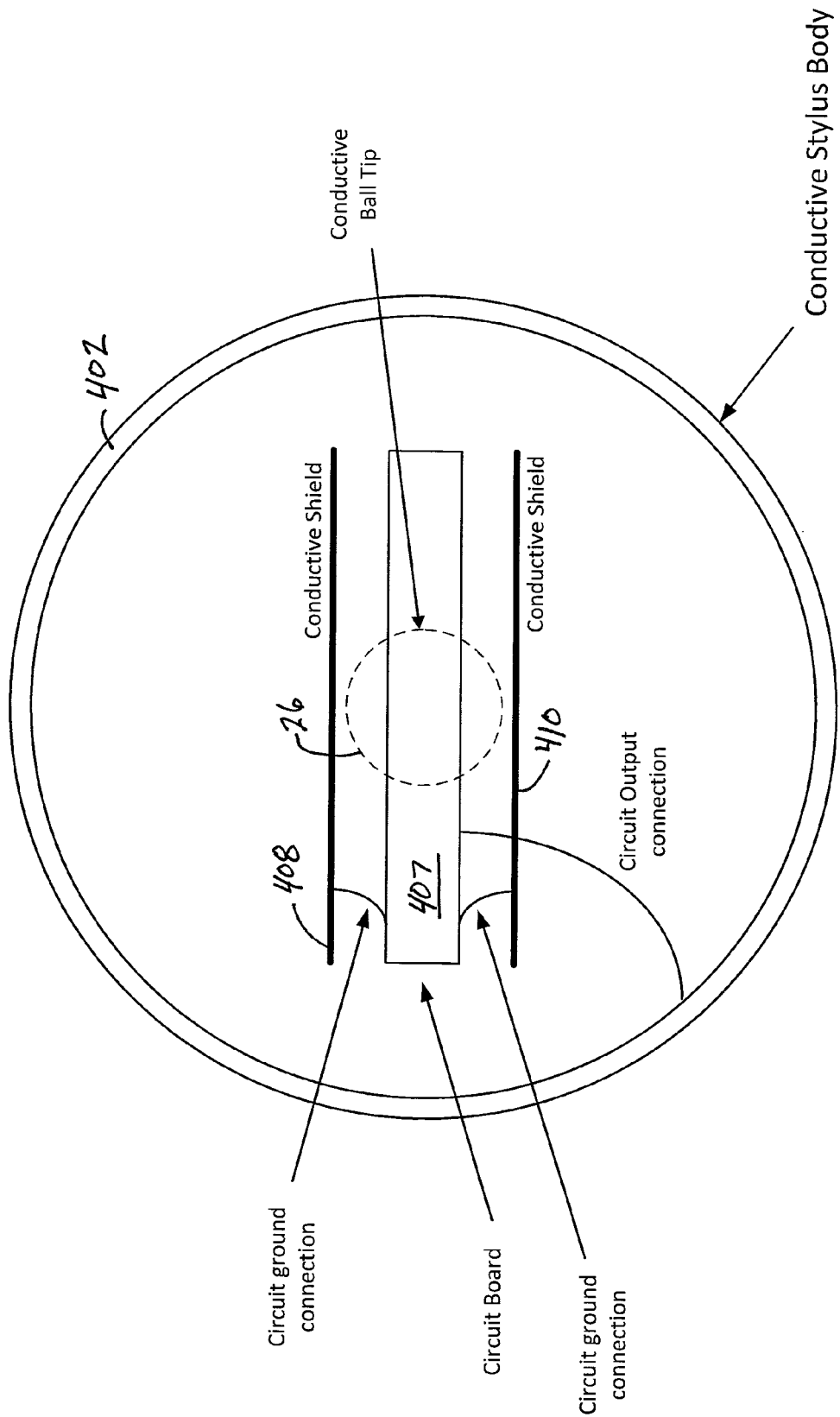

FIGS. 11a through 11c are end-view cross-sections of the stylus assembly 10 illustrating various configurations for shielding the input to the stylus circuitry described in FIGS. 2 and 3 from the output of the circuitry to prevent oscillation (the sample/hold configuration disclosed in FIG. 4 may not require shielding). In FIG. 11a, a tubular shielding 400 connected to stylus circuit ground is located concentrically within and spaced between circuit board 405 and stylus barrel 402. In FIG. 11b, one or more PCB ground layers or power layers 404 of the stylus circuit board 406 are utilized to shield the stylus circuitry and prevent oscillation. In FIG. 11c, shielding is provided in a parallel plane 408 and/or 410 spaced above and/or below stylus circuitry 407. Other shielding configurations may be implemented for shielding the input circuitry from the circuitry output to prevent oscillation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A circuit for a capacitive touch screen stylus, the circuit comprising:
   a. a conductive tip for providing capacitive coupling with a capacitive touch screen;
   b. an inverting charge integrator connected to the conductive tip for providing an output signal proportional to a charge induced at the conductive tip;
   c. an inverting amplifier for generating an amplified signal proportional to the signal output from the inverting charge integrator;
   d. a conductive contact for providing electrical or capacitive coupling between the amplified signal and an exterior of the stylus; and
   e. a power supply circuit for powering the inverting charge integrator and the inverting amplifier.

2. The circuit of claim 1 wherein a positive transition in potential at the tip results in a positive transition in voltage at the conductive contact.

3. The circuit of claim 2 wherein the batteries are rechargeable.

4. The circuit of claim 1 wherein a negative transition in potential at the tip results in a negative transition in voltage at the conductive contact.

5. The circuit of claim 1 wherein the inverting charge integrator and the inverting amplifier comprise one or more operational amplifiers.

6. The circuit of claim 1 additionally comprising shielding for isolating at least the connection between the tip and the inverting charge integrator.

7. The circuit of claim 6 wherein the shielding is connected to a ground of the stylus circuit.

8. The circuit of claim 6 wherein the shielding comprises a conductive enclosure having a circular cross-section and extending along an axis of at least a portion of the stylus.

9. The circuit of claim 6 wherein the shielding comprises a conductive wrapping around at least a portion of the stylus circuit.

10. The circuit of claim 6 wherein the shielding comprises a substantially continuous conducting layer of a circuit board for the stylus circuit.

11. The circuit of claim 6 wherein the shielding comprises one or more conducting planes above and/or below a plane of the stylus circuit.

12. The circuit of claim 6 wherein the shielding comprises one or more conducting planes in a plane of the stylus circuit.

13. The circuit of claim 1 wherein the conductive contact is connected or coupled to an external surface of a stylus.

14. The circuit of claim 1 wherein the inverting charge integrator and the inverting amplifier are combined.

15. The circuit of claim 1 wherein the power supply circuit comprises one or more batteries.

16. The circuit of claim 1 wherein the power supply circuit additionally comprises a DC-to-DC converter for increasing voltage supplied to the inverting charge integrator and the inverting amplifier.

17. The circuit of claim 16 wherein an input ground and an output ground of the DC-to-DC converter are common.

18. The circuit of claim 16 wherein the DC-to-DC converter includes regulator circuitry utilizing feedback for regulating an output voltage and wherein an optical isolator communicates a level of the output voltage to a feedback input to the convertor.

19. The circuit of claim 1 wherein the conductive tip is metallic.

20. The circuit of claim 1 wherein the conductive tip comprises a conductive polymer.

21. The circuit of claim 1 wherein the conductive tip has a cross-section projected onto the touch screen of less than 3.5 millimeters.

22. The circuit of claim 1 wherein the conductive tip includes a ball point.

23. A circuit for a capacitive touch screen stylus, the circuit comprising:
   a. a conductive tip for providing capacitive coupling with a capacitive touch screen;
   b. an inverting transimpedance amplifier connected to the conductive tip for generating an output signal proportional to a current induced at the conductive tip;
   c. an inverting integrator for providing an output voltage proportional to an integrated output signal of the inverting transimpedance amplifier;
   d. a conductive contact for providing electrical or capacitive coupling between the output voltage from the inverting integrator to an exterior portion of the stylus; and
   e. a power supply circuit for powering the inverting transimpedance amplifier first and the inverting integrator.

24. The circuit of claim 23 wherein the conductive tip has a cross-section projected onto the touch screen of less than 3.5 millimeters.

25. The circuit of claim 23 wherein the conductive tip includes a ball point.

26. A stylus for a capacitive touch screen, the stylus comprising:
   a. an elongated barrel for enclosing a stylus circuit comprising:
      i. an integrator circuit connected to a conductive tip of the stylus for generating an output signal proportional to a charge induced at the conductive tip;
      ii. an amplifier circuit for providing an output voltage proportional to the output signal from the integrator circuit; and
      iii. a conductive contact for providing electrical or capacitive coupling between the output voltage from the amplifier circuit and a surface of the stylus.

27. The circuit of claim 26 wherein the conductive tip has a cross-section projected onto the touch screen of less than 3.5 millimeters.

28. The circuit of claim 26 wherein the conductive tip includes a ball point.

29. A stylus for a capacitive touch screen, the stylus comprising:
   a. an elongated barrel for enclosing a stylus circuit comprising:
      i. an amplifier circuit for providing an output signal proportional to the current induced at a conductive tip of the stylus;
      ii. an integrator circuit for generating an output voltage proportional to the output signal from the amplifier circuit; and
      iii. a conductive contact for providing electrical or capacitive coupling between the output voltage from the integrator circuit and a surface of the stylus.

30. The circuit of claim 29 wherein the conductive tip has a cross-section projected onto the touch screen of less than 3.5 millimeters.

31. The circuit of claim 29 wherein the conductive tip includes a ball point.

32. A capacitive touch screen stylus comprising:
   a. an amplifier circuit for providing an output signal proportional to the current induced at a conductive tip of the stylus;
   b. an integrator circuit for generating an output voltage proportional to the output signal from the amplifier circuit; and
   c. a conductive contact for providing electrical or capacitive coupling between the output voltage from the integrator circuit and a surface of the stylus.

33. The stylus of claim 32 wherein the conductive tip has a cross-section projected onto the touch screen of less than 3.5 millimeters.

34. The stylus of claim 32 wherein the conductive tip includes a ball point.

35. A method for charging a tip of a stylus for a capacitive touch screen, the method comprising:
   a. determining an amount of charge induced at a stylus tip by a positive or negative going drive line transition in a capacitive touch screen; and
   b. outputting to an exterior of the stylus a positive or negative going voltage change that is proportional to the determined amount of charge wherein a positive going drive line transition results in a positive going output voltage change, and a negative going drive line transition results in a negative going output voltage change.

36. A stylus for a capacitive touch screen comprising:
   a. circuitry for determining an amount of charge induced at a stylus tip by a positive or negative going drive line transition in a capacitive touch screen; and
   b. circuitry for outputting to an exterior of the stylus a positive or negative going voltage change that is proportional to the determined amount of charge wherein a positive going drive line transition results in a positive going output voltage change, and a negative going drive line transition results in a negative going output voltage change.

* * * * *